United States Patent [19]

Henderson

[11] 4,018,400
[45] Apr. 19, 1977

[54] VEHICLE INERTIA SENSORS

[75] Inventor: Cyril Henderson, Woodland Hills, Calif.

[73] Assignee: American Safety Equipment Corporation, Encino, Calif.

[22] Filed: Aug. 11, 1975

[21] Appl. No.: 603,519

[52] U.S. Cl. .................................. 242/107.4 A
[51] Int. Cl.² .................. A62B 35/02; B65H 75/48
[58] Field of Search ........................... 242/107.4 A; 200/61.45 R, 61.58 B, 61.52, 52 A; 188/135–139; 280/744–747; 297/388

[56] References Cited

UNITED STATES PATENTS

| | | | |
|---|---|---|---|
| 3,343,765 | 9/1967 | Baker | 242/107.4 A |
| 3,722,824 | 3/1973 | Hayashi | 242/107.4 A |
| 3,770,224 | 11/1973 | Hayashi et al. | 242/107.4 A |
| 3,850,383 | 11/1974 | Lewis | 242/107.4 A |

Primary Examiner—George F. Mautz
Assistant Examiner—John M. Jillions
Attorney, Agent, or Firm—Poms, Smith, Lande & Glenny

[57] ABSTRACT

A seat belt webbing retractor for a vehicle prevents protraction of the webbing when the vehicle undergoes changes in momentum above a predetermined level. The retractor includes a retractor frame, a lockable belt storage reel and associated reel lock actuating means including a lever movable in response to movement of an associated inertia sensing pendulum. The invention includes the improvement of providing a pendulum body which includes a light weight base of cup-like configuration which has two interiorly formed actuator camming surfaces, a hollow cylindrical inertia sensing mass of a material relatively heavier than the base and means for securely attaching the mass to the base with the hollow mass and the apertured base providing a vertical axial bore through the pendulum body. An actuator shaft is disposed in the axial bore of the pendulum body and includes a thrust flange intermediate its upper and lower ends, the flange being contained within the pendulum body and normally resting on the primary actuator camming surface with the upper end of the actuator shaft extending outwardly of the pendulum. Support means on the retractor are provided for supporting the pendulum and the actuator shaft in an operative relationship for moving the lever to cause lock-up of the retractor upon movement of the pendulum body on the support and relative to said actuator shaft, the actuator shaft being moved first by engagement between the thrust flange and the primary camming surface. A secondary camming surface adjacent to and inclined upward from the primary camming surface is provided for supplying additional force to the actuator during the final stages of locking engagement. The pendulum support means are further provided with lever mounting means for mounting the locking lever to the support whereby the pendulum body, the actuator shaft, the support and the lever form a self-contained inertia sensing retractor reel lock actuating assembly.

17 Claims, 6 Drawing Figures

U.S. Patent  April 19, 1977  4,018,400
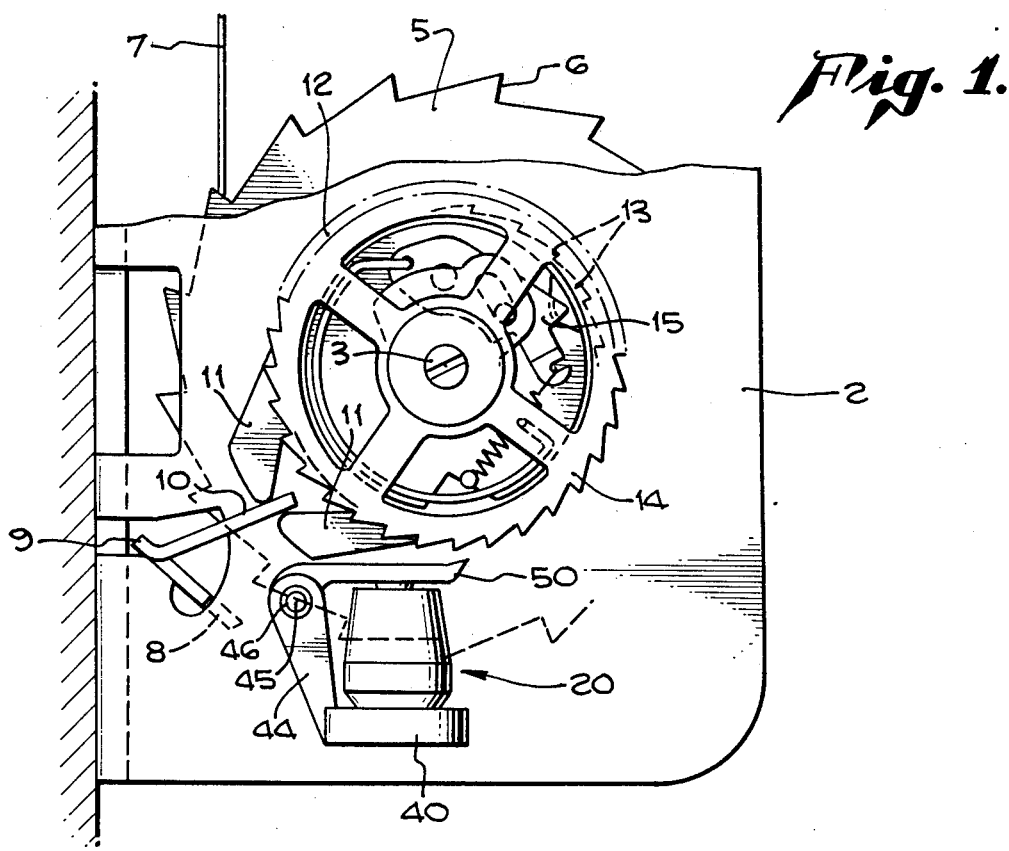
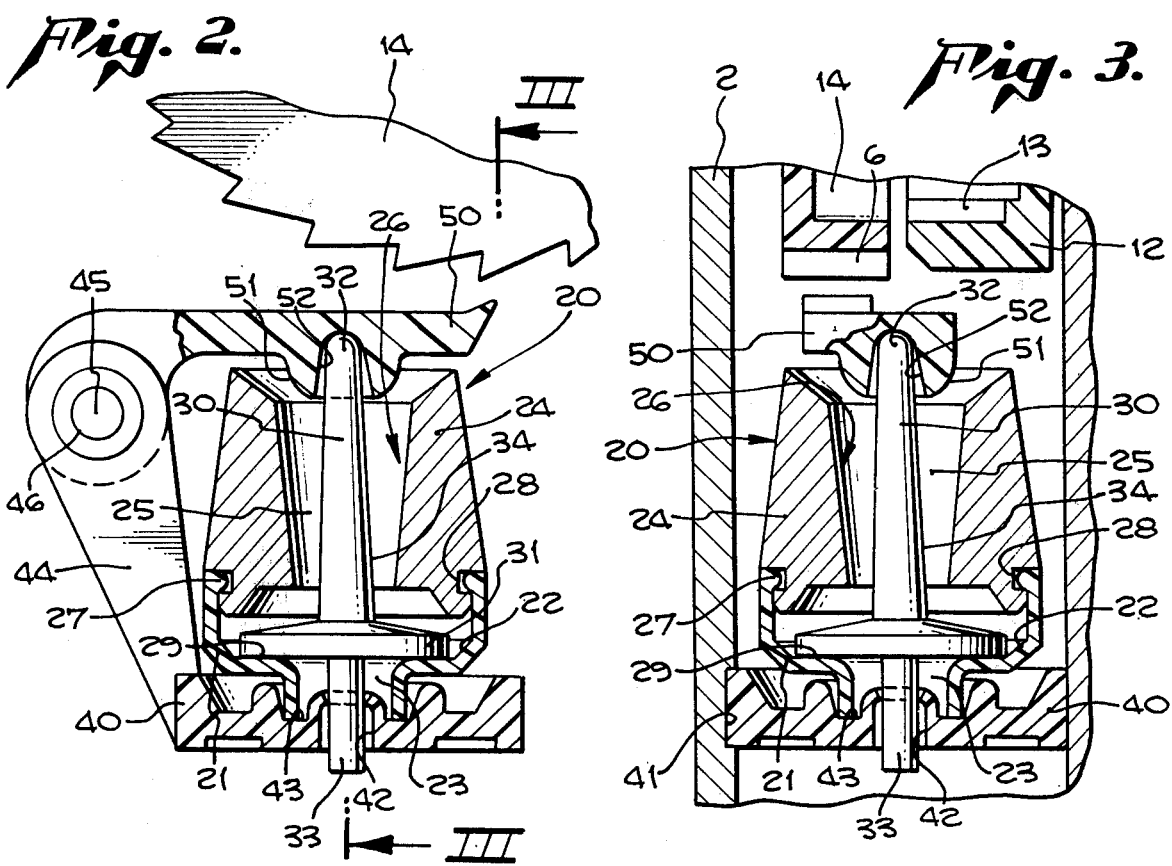

VEHICLE INERTIA SENSORS

BACKGROUND OF THE INVENTION

The present invention relates generally to seat belt webbing retractors for vehicles, wherein it is desirable to have the belt storage reel freely rotatable to allow routine belt adjustment by a passenger. However, it is mandatory that during a crash or other emergency the retractor lock to prevent continued protraction of the belt.

Retractors have incorporated means for sensing changes in vehicle momentum or attitude. These retractors lock the belt storage reel when the vehicle undergoes changes in momentum above a predetermined limit or where it flips or rolls over.

In the prior art the inertia sensing mechanisms have had a direct load-bearing function during lock-up. An example of such mechanism may be found in United States Pat. No. 3758044 (Nilsson) Sept. 11, 1973.

In addition, separate housings within the retractor frame have been required to contain and protect the inertia sensing mechanism.

One of the objects of the present invention is to provide an improved inertia sensing safety belt storage reel lock actuating assembly which bears no load during an emergency. The load being transferred directly from the belt to the retractor frame and not through the inertia sensing mechanism, will allow the use of low-cost plastic parts within the inertia sensing mechanism.

A further object of the present invention is to provide a self-contained inertia sensing mechanism which will obviate the need for a separate housing for the inertia sensor and result in a smaller over-all retractor size.

SUMMARY OF THE INVENTION

The seat belt webbing retractor of the present invention includes a retractor frame, a lockable belt storage reel and an associated reel lock activating mechanism. The reel lock activating mechanism includes a locking movable in response to an associated inertia sensing pendulum and a locking gear. The reel lock actuating mechanism has been improved by the provision of a pendulum body including a light weight base of cup-like configuration having two interiorly formed actuator camming surfaces, a hollow cylindrical inertia sensing mass of a material relatively heavier than the base and means for attaching the mass to the base, with the hollow mass and the apertured base providing a vertical axial bore therethrough. An actuator shaft is disposed within the axial bore of the pendulum body and includes a thrust flange intermediate its upper and lower ends. The flange is contained within the pendulum body and normally rests on the primary actuator camming surface. The upper end of the actuator shaft extends outwardly of the mass. A support has been provided on the retractor for supporting the pendulum body and the actuator shaft in an operative relationship for moving the lever to cause lock-up of the retractor upon movement of the pendulum body on the support and relative to the actuator shaft. The actuator shaft is moved by engagement between the thrust flange and primary and secondary camming surfaces.

BRIEF DESCRIPTION OF THE DRAWINGS:

FIG. 1 is a partial side sectional view of a retractor mechanism showing the retractor in its normal free-spooling condition without being prevented from protective rotation by the vehicle inertia sensing reel lock actuating means.

FIG. 2 is a side sectional view of the inertia sensing reel lock actuating means in its normal unlocked condition.

FIG. 3 is a sectional view of the inertia sensing reel lock actuating means of FIG. 2 taken along the plane III—III.

Figure 4:
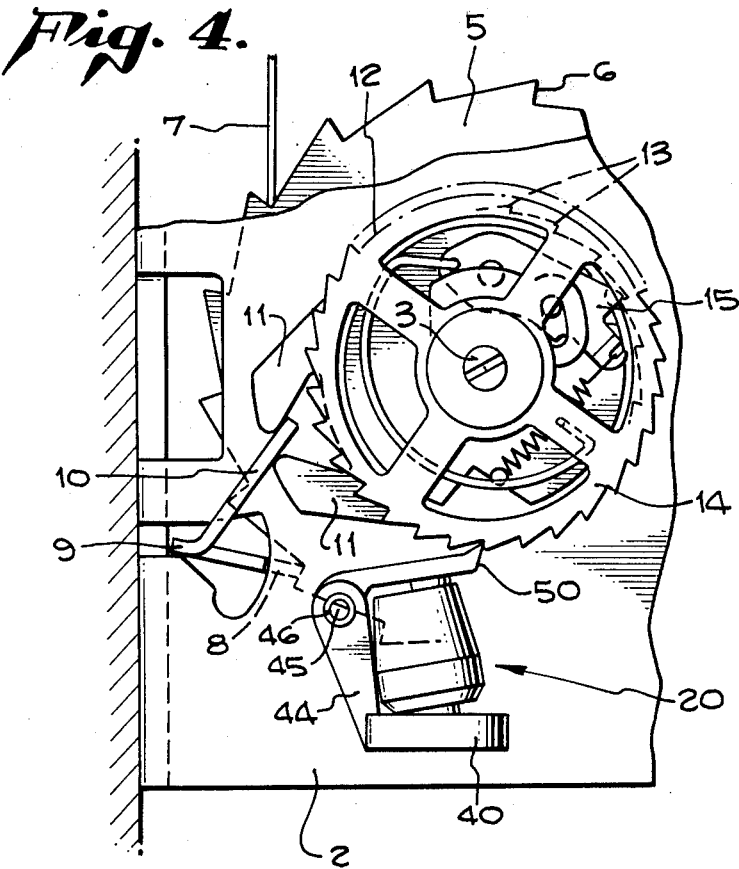
FIG. 4 is a partial side sectional view of a retractor mechanism showing the retractor in a locked condition wherein the vehicle inertia sensing reel lock actuating means has activated the reel.

DETAILED DESCRIPTION OF THE PREFERRED EMBODIMENT:

A seat belt webbing retractor for a vehicle for preventing the protraction of the webbing when the vehicle undergoes changes in momentum above a predetermined level is shown generally in FIGS. 1 and 4. In the exemplary embodiment, the retractor comprises the provision of a generally U-shaped retractor frame 2, a lockable belt storage reel 5 having a shaft 3 rotatably mounted on frame 2 and ratchet teeth for engagement with locked pawl 8 upon lock-up of the retractor. A spring (not shown) biases the belt storage reel 5 in a counter-clockwise direction to wind belt webbing 7 onto belt storage reel 5. (FIGS. 1 and 4).

Reel lock actuating means are providing for locking the reel to prevent protractive rotation of the belt storage reel. In the exemplary embodiment, the locking means includes ratchet teeth 6 on the belt storage reel 5 (FIGS. 1 and 4). Lock pawl 8 is mounted on lock bar 9 which is pivotally mounted on the frame in a known manner to engage the ratchets and prevent the protractive rotation (clockwise in FIG. 1 and 4) by the belt storage reel. The reel lock means includes a lock bar extension 10 which fits between ears 11 of lock-cup 12. Lock-cup 12 is provided with inwardly facing teeth 13 and is rotatably mounted on shaft 3. A small clockwise rotation of lock-cup 12 causes the ears 11 to pivot the lock bar extension 10 moving lock pawl 8 on lock bar 9 into engagement with ratchet teeth 6. A spring, not shown, which is attached at one end to the retractor frame 2 biases lock bar 9 to a position where lock pawl 8 is normally out of engagement with ratchet teeth 6. It can be readily seen, therefore, that for the ratchet teeth to be engaged to lock the belt storage reel, the lock pawl must be positively driven into position by ears 11.

A locking gear 14 is rotatably mounted upon the shaft adjacent the lock-cup 12 and lock-cup latch 15 is provided such that, when locking gear 14 is engaged by locking lever 50, any slight protractive force upon the safety belt webbing 7 will cause the latch to engage the inwardly facing teeth 13 of lock-cup 12. Any further protractive movement will cause the lock-cup ears 11 to move the lock pawl 8 into engagment with ratchet teeth 6, thereby locking the belt webbing storage reel (compare FIGS. 1 and 4). For a further detailed discussion of the lock-cup latch mechanism reference is made to U.S. patent application Ser. No. 576 308 (Sugar).

A associated reel lock activating mechanism, including a locking lever and an inertia sensing pendulum is provided. In the exemplary embodiment, locking lever 50 is movable in response to movement of an associated inertia sensing pendulum 20. Upon movement of the pendulum, locking lever 50 engages locking gear 14, thereby actuating the reel locking sequence.

An inertia sensing pendulum body which is responsive to changes in vehicle momentum is provided. In the exemplary embodiment, the pendulum body 20 includes a light weight base 21 of cup-like configuration having an interiorly formed primary actuator camming surface 29 and an interiorly formed secondary actuator camming surface 22. A hollow cylindrical inertia sensing mass 24, of a material relatively heavier than that of the base, is attached to the base by means of an interlocking snap-fit between an interior annular rib 27 within an upper portion of the base and an exterior annular channel 28 on a lower portion of the inertia sensing mass. A vertical axial bore is formed within the inertia sensing pendulum by the central cavity 25 of inertia sensing mass 24 and aperture 23 of base 21 (FIGS. 2 and 3).

An actuator shaft is disposed within the axial bore of the pendulum body. In the exemplary embodiment, actuator shaft 30 is provided with a thrust flange 31 located intermediate the upper and lower end of actuator shaft 30. Thrust flange 31 is contained within the axial bore of the pendulum body, resting upon actuator camming surface 29 in a force transmitting relationship. An upper end or tip 32 of the actuator shaft extends outwardly beyond the top of mass 24 (FIG. 2 and 3).

Figure 5:
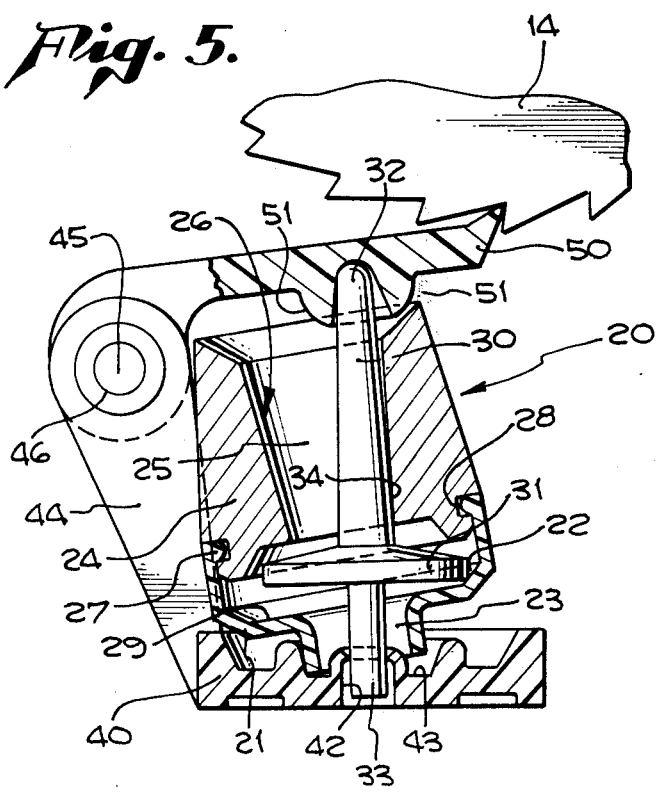
FIG. 5 is a side sectional view of the inertia sensing reel lock activating means in an activated or locked condition.
Figure 6:
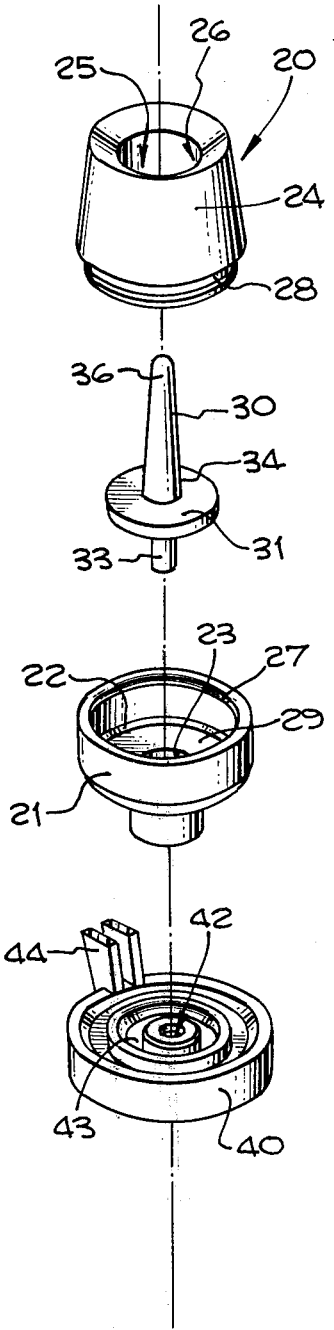
FIG. 6 is an exploded view showing the inertia sensing means.

Support means are provided for supporting inertia sensing pendulum 20 and the enclosed actuator shaft 30 on retractor frame 2. In the exemplary embodiment, pendulum support 40 is positioned by means of retractor frame recess 41 such that inertia sensing pendulum 20 and actuator shaft 30 are supported in operative relation with locking level 50 whereby, upon movement of inertia sensing pendulum 20 on pendulum support 40 relative to actuator shaft 30, the actuator shaft, being moved by engagement between thrust flange 31 and actuator camming surfaces 29 and 22, moves locking lever 50 into engagement with locking gear 14 thereby actuating the belt storage reel locking assembly and preventing further protractive rotation of belt storage reel 5 (FIG. 5).

In the exemplary embodiment, locking lever 50 is further provided with socket means 52 within a central lower portion thereof in force transmitting relation with the actuator shaft 30 such that the shaft is aligned within the axial bore of the inertia sensing pendulum 20 and maintained in operative position to the locking lever (FIGS. 2 and 3).

In the exemplary embodiment, actuator shaft 30 is provided with a rounded tip 32 which is fitted into socket 52 to allow relative rotation therebetween during movement of the lever by the actuator shaft (FIGS. 2 and 3).

In the exemplary embodiment, actuator shaft 30 is further provided with a pendulum body mass stop 34 which limits the displacement of the pendulum body by means of an abuttable contact with the interior surface 26 of mass 24.

The light weight base 21 is provided with a first central aperture 23 and the actuator shaft 30 is provided with an alignment pin 33 at a lower end. In the exemplary embodiment, alignment pin 33 extends through central aperture 23 of the pendulum base into support aperture 42, thereby aligning actuator shaft 30 within the axial bore of the inertia sensing pendulum 20 on support 40 (FIGS. 2 and 3).

In the exemplarly embodiment, support 40 is mounted cantilever fashion from retractor frame recess 41 thereby eliminating the need for complex or bulky mounting brackets and allowing a thinner more compact retractor design (FIG. 3).

In the exemplary embodiment, support 40 is provided with annular groove 43 which receives the pendulum base 21 and retains the base in a generally axially aligned position with support aperture 42 (FIGS. 2, 3, 5 and 6).

Pendulum support 40 is further provided with means for mounting locking lever 50 to the pendulum support 40. In the exemplary embodiment, mounting arm 44, including pivot shaft 45, shaft support apertures 46 and a bias spring (not shown) for urging locking lever 50 toward pendulum support 40, pivotally mounts locking lever 50 such that, when actuator shaft 30 is enclosed within inertia sensing pendulum 20 and when base 21 of inertia sensing pendulum 20 is positioned within annular groove 43 on pendulum support and actuator shaft tip 32 is positioned within socket 52, thereby forming a self-contained inertia sensing seat belt webbing retractor reel lock actuating assembly (FIGS. 2, 3 and 5).

Two important advantages of the present invention will be noted at this point. First, neither locking lever 50, locking gear 14, pendulum base 21, pendulum support 40 nor actuator shaft 30 are load bearing during prevention of protraction of the webbing. Therefore, these parts can be inexpensively fabricated of plastic and will require little maintenance during use. Secondly, as the assembly is self-contained, no assembly housing is required to protect the lock activator, resulting in a reduction in overall retractor width.

The operation of the reel lock actuating mechanism of the present invention comprises the steps of operating the actuator at a primary rate of speed and acceleration in response to movement of an inertia mass during initial stages of displacement of the mass, and thereafter, operating the actuator at a secondary rate of speed and acceleration, and with greater force than during the primary rate of speed and acceleration, during final stages of displacement of the mass. In the exemplary embodiment, the operation of the actuator 30 at a primary rate of speed and acceleration is accomplished by means of a contact between thrust flange 31 and primary actuator camming surface 29. When inertia sensing pendulum 20 is supported in the generally perpendicular attitude, as during normal vehicle operation (FIGS. 2 and 3), thrust flange 31 of actuator shaft 30 lies upon primary actuator camming surface 29 of pendulum base 21. As the pendulum is initially displaced from a generally perpendicular attitude, as during abnormal or emergency vehicle operation (FIG. 5), a portion of the primary actuator camming surface 29 of pendulum base 21 is forced upwardly against a peripheral portion of thrust flange 31, causing actuator shaft 30 to be moved vertically. As the vertical movement is initiated, secondary actuator camming surface 22 beings to slide underneath thrust flange 31, thereby further lifting actuator shaft 30 which shaft in turn moves locking lever 50 toward engagement with locking gear 14.

It will be understood that various modifications and changes may be made in the configuration of the reel lock actuating means described above which may come within the spirit of this invention and all such changes and modifications coming within the scope of the appended claims are embraced thereby.

I claim:

1. In a seat belt webbing retractor for a vehicle for preventing protraction of said webbing when the vehicle undergoes changes in momentum above a predetermined level, the retractor including a retractor frame, a lockable belt storage reel and associated reel lock actuating means including lever means moveable in response to movement of an associated inertia sensing pendulum means, the improvement in such reel lock actuating means comprising the provision of:

a pendulum body including a light weight apertured base of cup-like configuration having an interiorly formed actuator camming surface means, a hollow cylindrical inertia sensing mass of a material relatively heavier than said base and means for securely attaching said mass to said base with said hollow mass and apertured base providing a vertical axial bore therethrough;

actuator shaft means disposed in said axial bore of said pendulum body and including a thrust flange intermediate its upper and lower ends, said flange being contained within said pendulum body and normally resting on said actuator camming surface means and with said upper end extending outwardly of said mass; and support means on said retractor for supporting said pendulum body with said actuator shaft means upper end positioned for moving said lever means to cause lockup of said retractor upon movement of said pendulum body on said support means and relative to said actuator shaft means, said actuator shaft means being moved by engagment between said thrust flange and said camming surface means.

2. The improvement in seat belt retractor of claim 1 wherein said actuator camming surface means comprises the provision of primary and secondary camming surfaces for providing a successive camming engagement of said thrust flange by said surfaces.

3. The improvement in seat belt retractor of claim 1, wherein said lever means further comprises the provision of socket means within a central lower portion thereof in force transmitting relation with said actuator shaft means for aligning said actuator shaft means within said axial bore of said pendulum body and maintaining it in operative position relative to said lever.

4. The improvement in seat belt retractor of claim 3, wherein said actuator shaft means further comprises the provision of rounded tip means in force transmitting relation within said socket means for allowing relative movement therebetween during movement of said lever means to cause said lock-up of said retractor.

5. The improvement in seat belt retractor of claim 3, wherein said actuator shaft means further comprises the privision of pendulum body mass stop means for limiting the displacement of said pendulum body.

6. The improvement in seat belt retractor of claim 1, wherein:

said support means includes a shaft alignment aperture; and said actuator shaft means includes an alignment pin means on a lower end thereof extending through said pendulum body apertured base into said support means shaft alignment aperture for aligning said actuator shaft means within said pendulum body on said support means.

7. The improvement in seat belt retractor of claim 1 comprising mounting means on said retractor for mounting said support means in cantilever fashion from a side wall of said frame.

8. The impovement in seat belt retractor of claim 7, wherein said pendulum body has a depending annular portion and said support means further comprises the provision of annular positioning means for receiving said pendulum body base annular portion and retaining said base portion in a generally axially aligned position with said support shaft alignment aperture means.

9. The improvement in seat belt retractor of claim 1, wherein said support means further comprises the provision of lever mounting means for mounting said lever means to said support means, whereby said pendulum body, said actuator shaft means, said support means, and said lever means form a self-contained inertia sensing retractor reel lock actuating assembly.

10. A method for operating an inertia sensing safety belt reel lock activating assembly having an inertia sensing mass, which on tilting movement under changing inertia condition operates an actuator which in turn moves a locking lever to cause lockup of the retractor, comprising the steps of:

operating said actuator at a primary rate of speed through sliding engagement with a first linear surface rotating about a pivot point of the tilting mass in response to movement of said inertia sensing mass during initial stages of displacement of said mass; and thereafter operating said actuator at a secondary rate of speed through sliding engaement with a second linear surface rotating about said pivot point at a faster rate of speed than during said primary rate, during final stages of displacement of said mass.

11. A method for operating an inertia sensing safety belt reel lock activating assembly having an inertia sensing mass which on tilting movement under changing inertia conditions operates an actuator which in turn moves a locking lever to cause lock up of the retractor comprising the steps of:

operating said actuator at a primary rate of speed in response to movement of said inertia sensing mass during initial stages of displacement of said mass; and thereafter operating said actuator at a secondary rate of speed and at a faster rate of speed than during said primary rate, during final stages of displacement of said mass wherein:

said step of operating said actuator at a primary rate comprises moving said actuator by means of a contact between a portion of said actuator and a primary camming surface within an interior portion of said inertia sensing mass.

12. The method of claim 11, wherein: said step of operating said actuator at a secondary rate comprises moving said actuator by means of a slidable contact between a portion of said actuator and a secondary inclined camming surface within a interior portion of said inertia sensing mass.

13. A method for operating an inertia sensing safety belt reel lock activating assembly having an inertia sensing mass which on tilting movement under changing inertia condition operates an actuator which in turn moves a locking lever to cause lock-up of the retractor, comprising the steps of:

operating said actuator at a primary rate of speed in response to movement of said inertia sensing mass during initial stages of displacement of said mass; and thereafter operating said actuator at a secondary rate of speed and at a faster rate of speed than during said primary rate, during final stages of displacement of said mass, wherein:

said step of operating said actuator at a primary rate comprises moving said actuator by means of a contact between a portion of said actuator and a primary camming surface within an interior portion of said inertia sensing mass; and said step of operating said actuator at a secondary rate comprises moving said actuator by means of a slidable contact between a portion of said actuator and a secondary incline camming surface within an interior portion of said inertia sensing mass.

14. In a seat belt webbing retractor for a vehicle for preventing protraction of said webbing when the vehicle undergoes changes in momentum above a predetermined level, the retractor including a retractor frame, a lockable belt storage reel and associated reel lock actuating means including lever means moveable in response to movement of an associated inertia sensing pendulum means, the improvement in such reel lock actuating means comprising the provision of:

a pendulum body having a hollow interior in which an actuator camming surface means is provided, said body having a vertical bore extending from said hollow interior outwardly of said body;

actuator shaft means disposed partially in said pendulum body and including a thrust flange intermediate its upper and lower ends, said thrust flange normally resting on said camming surface means interiorly of said pendulum body; and support means on said retractor for supporting said pendulum body with said actuator shaft means upper end positioned for moving said lever means to cause lock-up of said retractor upon movement of said pendulum body on said support means and relative to said actuator shaft means, said actuator shaft means being moved by engagement between said thrust flange and said camming surface means.

15. The improvement in seat belt retractor of claim 14 wherein said pendulum body comprises a lightweight base of cup-like configuration having said camming surface means formed interiorly thereof, a hollow cylindrical inertia sensing mass of a material relatively heavier than said base and means for securely attaching said mass to said base.

16. The improvement in seat belt retractor of claim 15 wherein:

said pendulum body base is provided with an aperture therethrough to cause said vertically opening axial bore to extend entirely through said pendulum body; and said actuator shaft means includes a depending portion at its lower end which extends into said base aperture.

17. The improvement in seat belt retractor of claim 14 wherein said actuator camming surface means comprises the provision of primary and secondary camming surfaces for providing a successive camming engagement of said thrust flange by said surfaces.

* * * * *